United States Patent
Bao et al.

(10) Patent No.: US 6,795,083 B2
(45) Date of Patent: Sep. 21, 2004

(54) COLOR ENHANCEMENT OF ANALOG VIDEO FOR DIGITAL VIDEO SYSTEMS

(75) Inventors: Chunliang Bao, San Jose, CA (US); Jin Ji, Sunnyvale, CA (US)

(73) Assignee: SmartASIC, Inc., San Jose, CA (US)

( * ) Notice: Subject to any disclaimer, the term of this patent is extended or adjusted under 35 U.S.C. 154(b) by 297 days.

(21) Appl. No.: 09/885,431

(22) Filed: Jun. 19, 2001

(65) Prior Publication Data

US 2002/0190998 A1 Dec. 19, 2002

(51) Int. Cl.[7] ............ G09G 5/02; H04N 5/46; H04N 9/74; H04N 5/21; G06K 9/00
(52) U.S. Cl. ............ 345/589; 345/593; 345/597; 348/557; 348/577; 348/582; 348/625; 348/630; 348/638; 382/162; 382/167
(58) Field of Search .............. 345/581, 589–593, 345/597, 600, 604, 606, 617–619, 690–691; 348/514, 517, 519, 520, 527, 539, 557, 562, 566, 577, 582, 592, 596, 599, 603, 612, 617, 621, 624–625, 630–631, 635, 638, 642, 645, 646–651, 653–655, 662–663, 675–679, 683, 692, 713–718, 727, 728, 760, 802–803, 809–808, 628, 225.1; 382/162, 167; 358/515, 518–520

(56) References Cited

U.S. PATENT DOCUMENTS

| | | | | | |
|---|---|---|---|---|---|
| 4,296,433 A | * | 10/1981 | Rzeszewski | ............... | 348/628 |
| 4,797,733 A | * | 1/1989 | Takagi et al. | ............ | 348/225.1 |
| 5,374,964 A | * | 12/1994 | Rzeszewski | ............... | 348/625 |
| 5,381,239 A | * | 1/1995 | Reime | .......... | 386/25 |
| 5,418,574 A | * | 5/1995 | Miyabata et al. | ........... | 348/625 |
| 5,920,357 A | * | 7/1999 | Ohara | ........................ | 348/625 |
| 6,008,862 A | * | 12/1999 | Bellers | ....................... | 348/631 |
| 6,031,581 A | * | 2/2000 | Harrington | .................. | 348/630 |
| 6,195,467 B1 | * | 2/2001 | Asimopoulos et al. | ...... | 382/261 |

* cited by examiner

Primary Examiner—Mathewe C. Bella
Assistant Examiner—Wesner Sajous
(74) Attorney, Agent, or Firm—Bever, Hoffman & Harms, LLP; Edward S. Mao

(57) ABSTRACT

A method and system enhances the color of an image by manipulating the chrominance and/or luminance signals of the image. Specifically, a color enhancement system sharpens color changes for better picture quality on digital display systems. In one embodiment of the present invention, color changes are detected by a color change detection unit. If the color changes are significant, a color change sharpening unit sharpens the color change to enhance the image.

25 Claims, 7 Drawing Sheets

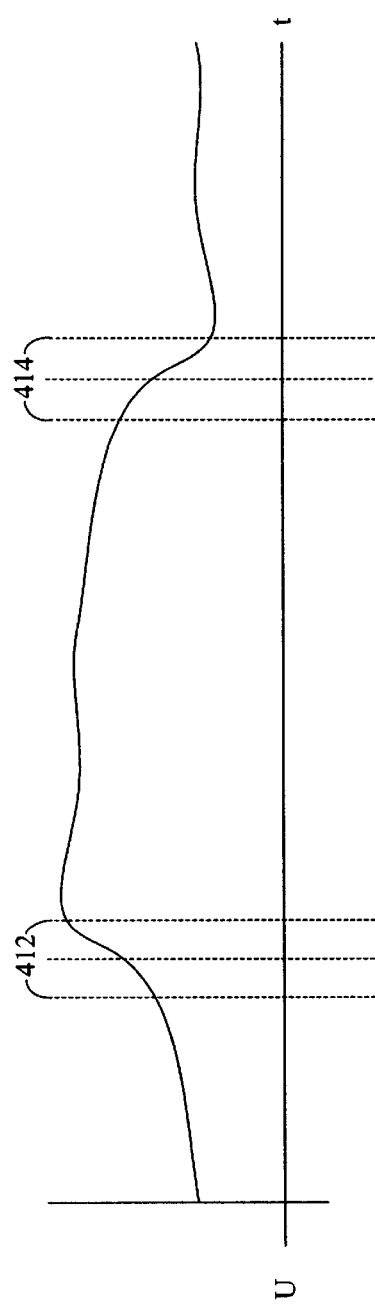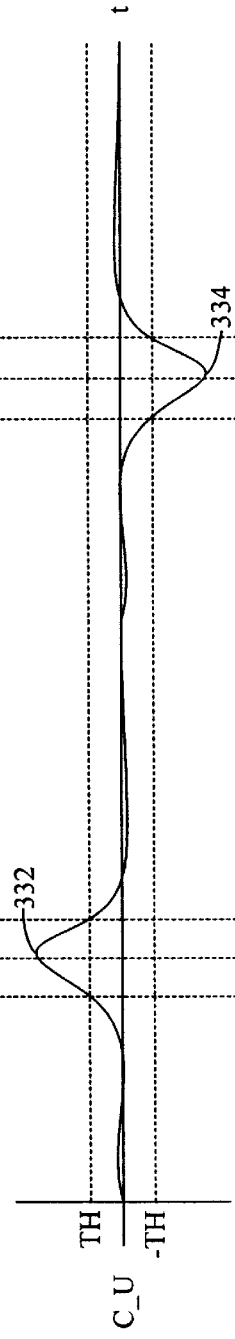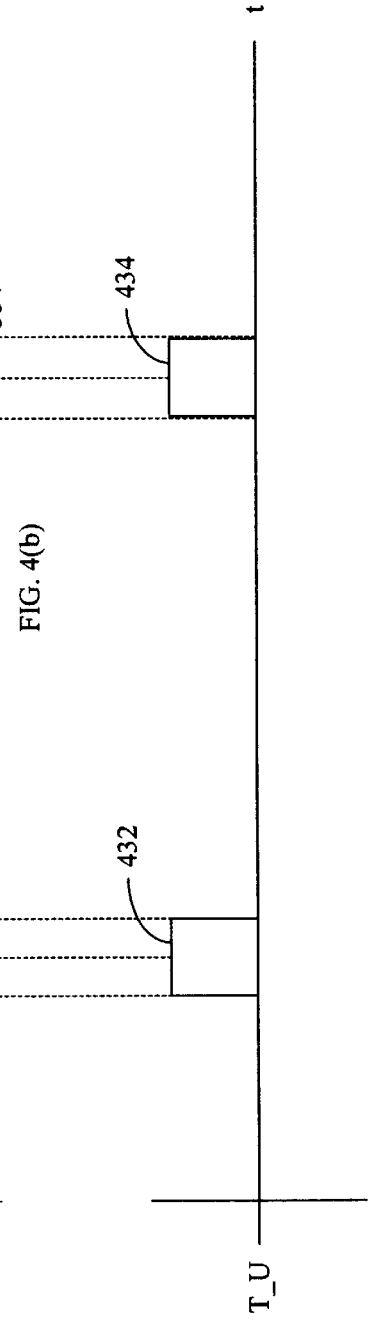

COLOR ENHANCEMENT OF ANALOG VIDEO FOR DIGITAL VIDEO SYSTEMS

BACKGROUND OF THE INVENTION

1. Field of the Invention

The present invention relates to digital graphics systems. More specifically, the present invention relates to methods and circuits for enhancing color changes of digitized analog video signals for digital display systems.

2. Discussion of Related Art

Analog video displays such as cathode ray tubes (CRTs) dominate the video display market. Thus, most electronic devices that require video displays, such as computers and digital video disk players, output analog video signals. As is well known in the art, an analog video display sequentially reproduces a large number of still images to give the illusion of full motion video. Each still image is known as a frame. For NTSC television, 30 frames are displayed in one second. For computer applications, the number of frames per seconds is variable with typical values ranging from 56 to 100 frames per seconds.

FIG. 1(a) illustrates a typical analog video display 100. Analog video display 100 comprises a raster scan unit 110 and a screen 120. Raster scan unit 110 generates an electron beam 111 in accordance with an analog video signal VS, and directs electron beam 111 against screen 120 in the form of sequentially-produced horizontal scanlines 101–109, which collectively form one frame. Screen 120 is provided with a phosphorescent material that is illuminated in accordance with the video signal VS transmitted in electron beam 111 to produce contrasting bright and dark regions that create an image, such as the diamond shape shown in FIG. 1(a). After drawing each scanline 101–108, raster scan unit 110 performs a horizontal flyback 130 to the left side of screen 120 before beginning a subsequent scanline. Similarly, after drawing the last scanline 109 of each frame, raster scan unit 110 performs a vertical flyback 131 to the top left corner of screen 120 before beginning a subsequent frame. To avoid generating an unwanted flyback traces (lines) on screen 120 during horizontal flyback 130, video signal 130 includes a horizontal blanking pulse that turn off electron beam 111 during horizontal flyback 130. Similarly, during vertical flyback 135, video signal VS includes a vertical blanking pulse that turns off electron beam 111 during vertical flyback 135.

FIG. 1(b) illustrates a typical analog video signal VS for analog video display 100. Video signal VS is accompanied by a horizontal synchronization signal HSYNCH and a vertical synchronization signal VSYNCH (not shown). Vertical synchronization signal VSYNCH contains vertical synch marks to indicate the beginning of each new frame. Typically, vertical synchronization signal VSYNCH is logic high and each vertical synch mark is a logic low pulse. Horizontal synchronization signal HSYNCH contains horizontal synch marks (logic low pulses) 133, 134, and 135 to indicate the beginning of data for a new scanline. Specifically, horizontal synch mark 133 indicates video signal VS contains data for scanline 103; horizontal synch mark 134 indicates video signal VS now contains data for scanline 104; and horizontal synch mark 135 indicates video signal VS now contains data for scanline 105.

Video signal VS comprises data portions 112, 113, 114, and 115 that correspond to scanlines 102, 103, 104, and 105, respectively. Video signal VS also comprises horizontal blanking pulses 123, 124 and 125, each of which is located between two data portions. As explained above, horizontal blanking pulses 123, 124, and 125 prevent the electron beam from drawing unwanted flyback traces on analog video display 100. Each horizontal blanking pulse comprises a front porch FP, which precedes a horizontal synch mark, and a back porch BP which follows the horizontal synch mark. Thus, the actual video data for each row in video signal VS lies between the back porch of a first horizontal blanking pulse and the front porch of the next horizontal blanking pulse. In color video signals, color data is multiplexed with luminance information in the data portions of video signal VS. Typically, video signal VS contains a luminance signal and two chrominance signals. The luminance signal, generally referred to as Y, corresponds to the brightness information for the image. The two chrominance signals, generally referred to as U and V, provide the color information. Multiplexed analog video signals are generally referred to as YUV format.

Digital video display units, such as liquid crystal displays (LCDs), are becoming competitive with analog video displays. Typically, digital video display units are much thinner and lighter than comparable analog video displays. Thus, for many video display functions, digital video displays are preferable to analog video displays. For example, a 19 inch (measured diagonally) analog video display, which has a 17 inch viewable area, may have a thickness of 19 inches and weigh 80 pounds. However, a 17 inch digital video display, which is equivalent to a 19 inch analog video display, may be only 4 inches thick and weigh less than 15 lbs. However, most computer systems are designed for use with analog video displays. Most computer systems output analog video signals, such as video signal VS and horizontal synchronization signal HSYNCH. Thus, the analog video signal provided by a computer must be converted into a format compatible with digital display systems.

FIG. 1(c) illustrates a typical digital display 150. Digital display 150 comprises a grid of picture elements ("pixels") divided into rows 151–159 and columns 161–174. Each data portion (e.g. data portions 112, 113, 114, and 115) is treated as one row of a digital display. Each data portion is also divided into smaller portions and digitized to form pixel data that is transmitted to its designated pixel using row driver 180 and column driver 190. Typically, digital pixel data is given in RGB format, i.e., red-green-blue, which provides the amount of red, green, and blue intensity for the pixel.

For most computer applications, the number of columns can be determined by the vertical resolution, which is equal to the number of rows. For example, common computer display formats include 640 columns by 480 rows (640× 480), 800 columns by 600 rows (800×600), 1024 columns by 768 rows (1024×768), and 1280 columns by 1024 rows (1280×768). If video signal VS (FIG. 1(b)) contains 480 rows, then data portion 114 is divided into 640 smaller portions, which are individually digitized to form 640 pixel data for pixels of one row. Typically, the digitized image is stored in a frame buffer, which is used to drive row driver 180 and column driver 190. The actual physical digital display unit may contain thousands of pixels, thus the digital image stored in the frame buffer must be scaled accordingly before being displayed on the digital display.

To create a digital display from an analog video signal, the analog video signal must be digitized at precise locations to form the pixels of a digital display. Furthermore, the YUV format of the analog video stream is typically converted into RGB format for the digital display. During the creation of color video systems, compatibility with pre-existing black and white video systems was preserved. Thus, the luminance signal of the color video stream uses most of the bandwidth of the color video stream. Therefore, the bandwidth of the chrominance signals had to be reduced. Using subjective testing had shown that the human eye was not perceptive to color changes over small areas of an analog video display. Thus the bandwidth of the chrominance signals are reduced by removing high-frequency components. Thus, color changes in analog video systems are gradual. However, gradual color changes on a digital video system have a blurry appearance. Hence, there is a need for a circuit or method to sharpen color changes in an analog video stream to enhance the appearance of a digital video stream derived from the analog video stream.

SUMMARY

The present invention detects and sharpens color changes in an image to improve the image for digital display systems. In accordance with one embodiment of the present invention, a color change detection unit detects color changes in chrominance signal. The color changes are analyzed to determine which color changes are significant color changes. Generally, color changes are significant if the color change is greater than a threshold value. A color change sharpening unit sharpens the significant color change.

In one embodiment of the present invention, color changes are detected by computing a color change signal. The color change signal could be for example a first derivative of the chrominance signal or an approximation of the first derivative of the chrominance signal. A threshold detection unit compares the color change signal to a threshold value. Portions of the color change signal greater than the threshold or less than a negative threshold are considered significant color changes. These portions of the color change window are used to define one or more sharpening windows. Some embodiments of the present invention limit the width of a sharpening window to a defined maximum width. Sharpening windows wider than the maximum width are truncated to the maximum width.

The color change sharpening unit sharpens the portions of the chrominance signal corresponding to the sharpening windows. In one embodiment of the present invention, sharpening is accomplished by increasing the slope of the chrominance signal by a gain factor within the sharpening window. The system and method can also be used on a second chrominance signal or the luminance signal to further enhance the image.

The present invention will be more fully understood in view of the following description and drawings.

BRIEF DESCRIPTION OF THE DRAWINGS

FIGS. 4(a), 4(b), and 4(c) illustrate the relationship of a chrominance signal U, a color change signal C_U, and a threshold signal T_U in accordance with one embodiment of the present invention.

DETAILED DESCRIPTION

Figure 1A:
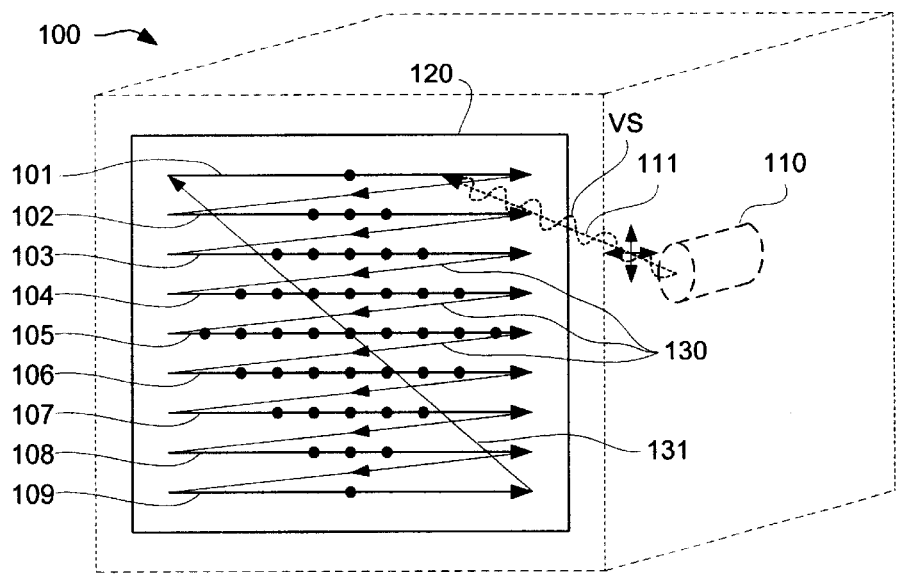
FIG. 1(a) is a simplified illustration of an analog video display.
Figure 1B:
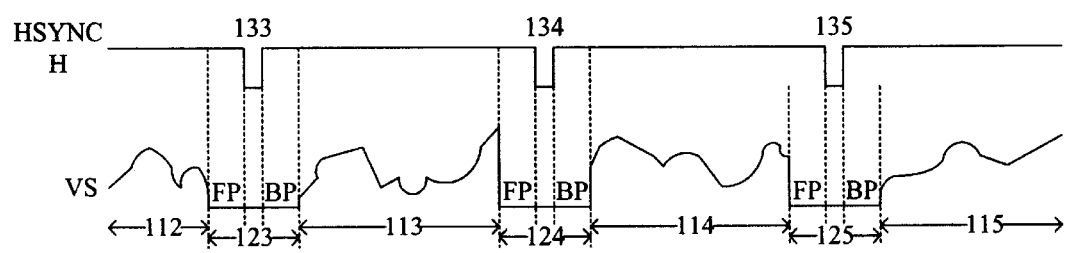
FIG. 1(b) is an analog video signal and a horizontal synchronization signal.
Figure 1C:
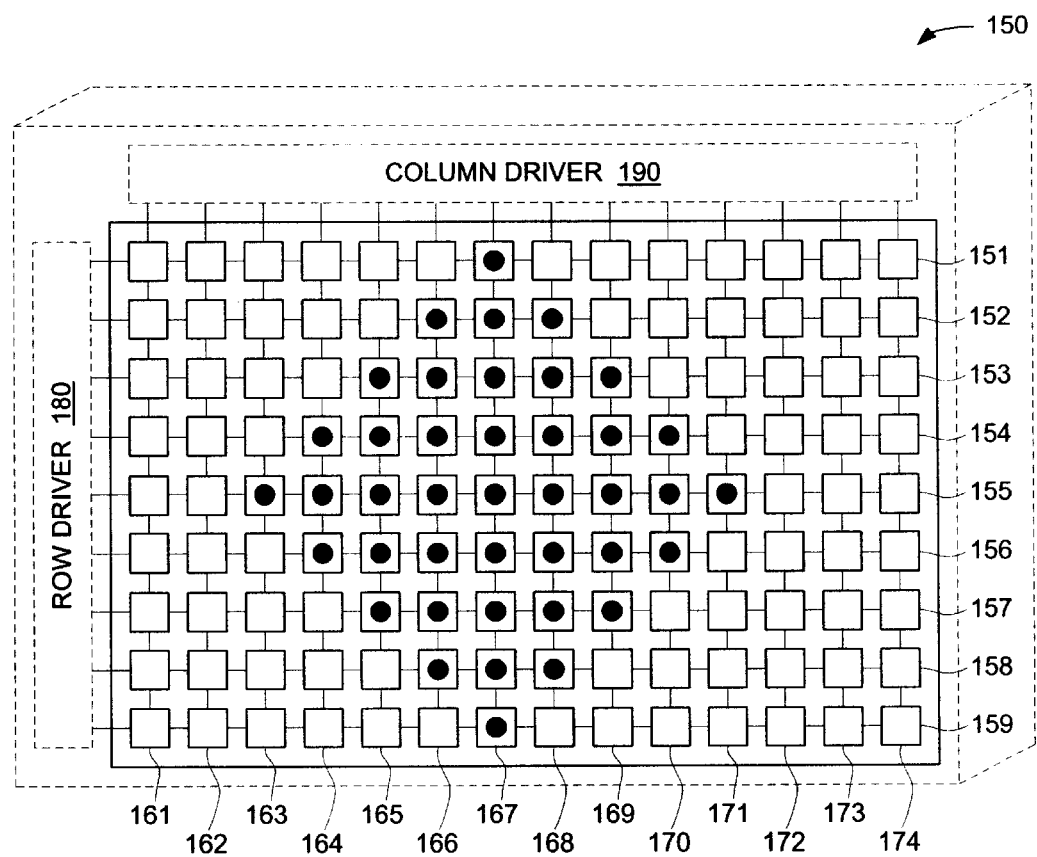
FIG. 1(c) is a simplified illustration of a digital video display.
Figure 2:
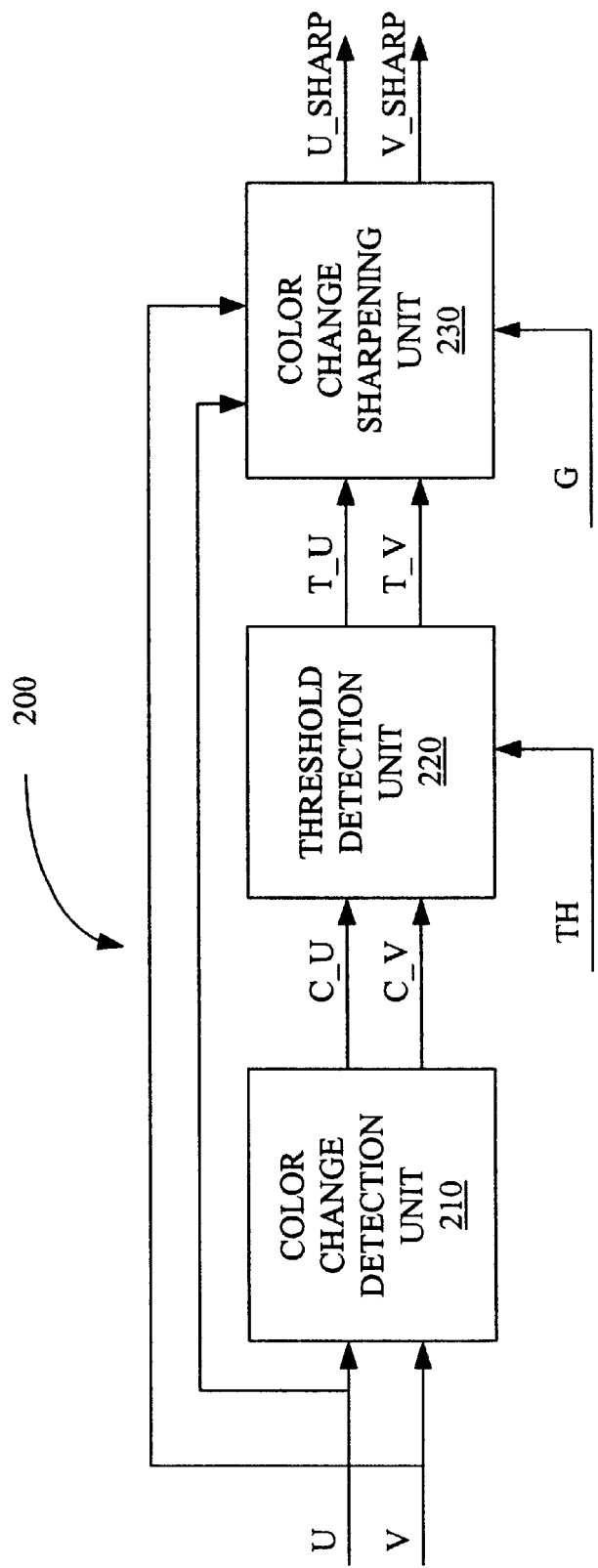
FIG. 2 is block diagram of a color enhancement circuit in accordance with one embodiment of the present invention.

FIG. 2 is a block diagram of a color enhancement circuit 200 in accordance with one embodiment of the present invention. Color enhancement circuit 200 comprises a color change detection unit 210, a threshold detection unit 220, and a color change sharpening unit 230. Color change detection unit 210 is configured to detect color changes in chrominance signals U and V. Generally, chrominance signals U and V are digitized prior to being received by color change detection unit 210. Color change detection unit 210 generates color change signals C_U and C_V for chrominance signals U and V, respectively. Color change signals C_V and C_U indicates the magnitude of the color change on chrominance signals V and U, respectively. For example, in one embodiment of the present invention color change detection unit 210 computes the slopes, i.e. first derivative, of chrominance signals U and V. The magnitude of the slope of the chrominance signals gives an indication of the magnitude of the color change. [Threshold detection unit 220 is coupled to color change detection unit 210 and receives color change signals C_U and C_V. Threshold detection unit 220 is configured to determine whether the color changes detected by color change detection unit 210 should be processed. For example, in one embodiment of the present invention, threshold detection unit compares the magnitude of each color change with a threshold TH. Only color changes above threshold TH are processed. Threshold detection unit 220 generates color threshold signals T_U and T_V to indicate where the magnitude of the color change of chrominance signals U and V, respectively, are above threshold TH.

Color change sharpening unit 230 is coupled to threshold detection unit 220 and is configured to sharpen selected color changes using a color gain G. Specifically, the color changes in which the magnitude of the color change is above threshold TH as indicated by threshold signals T_U and T_V are sharpened. In one embodiment of the present invention, color sharpening is achieved by increasing the slope of chrominance signal U or V by gain factor G during a color change. Color change sharpening unit 230 generates sharpened chrominance signals U_SHARP and V_SHARP.

Color sharpening of a chrominance signal U using Color enhancement circuit 200 is illustrated in FIGS. 3(a), 3(b), 4(a), 4(b), 5(a), 5(b), and 5(c). Color sharpening of chrominance signal V can be accomplished similarly.

Figure 3A:
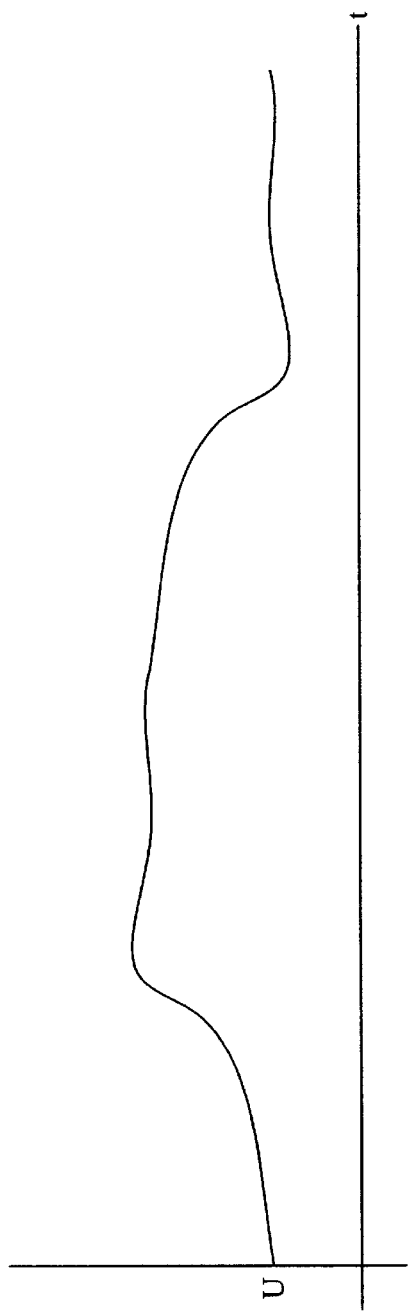
FIGS. 3(a) and 3(b) illustrate the relationship of a chrominance signal U with a color change signal C_U in accordance with one embodiment of the present invention.
Figure 3B:
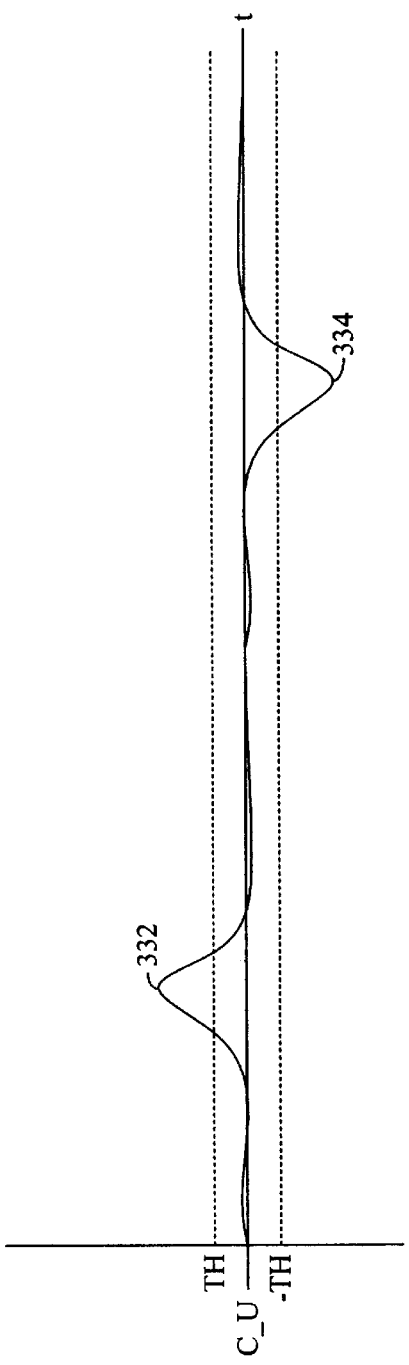

FIG. 3(a) shows a chrominance signal U over time. Changes in chrominance signal U represents changes of color. The speed of the change in chrominance signal U represents the speed of the color change of the video signal containing chrominance signal U. Thus, the slope of chrominance signal U can be used to represent the magnitude of the color change in chrominance signal U. Thus, as explained above, color change detection unit 210 can calculate color change signal C_U as the slope of chrominance signal U. FIG. 3(b) shows color change signal C_U, which can be obtained by taking the derivative of chrominance signal U. FIG. 3(b) also shows threshold TH as well as negative threshold −TH. Some embodiments of the present invention, use the absolute value of color change signal C_U to avoid using negative threshold −TH. As illustrated in FIG. 3(b), color change signal C_U includes a portion 332 above threshold TH and a portion 334 below negative threshold −TH. Portions 332 and 334 corresponds to portions of chrominance signal U undergoing significant color change.

Figure 3C:
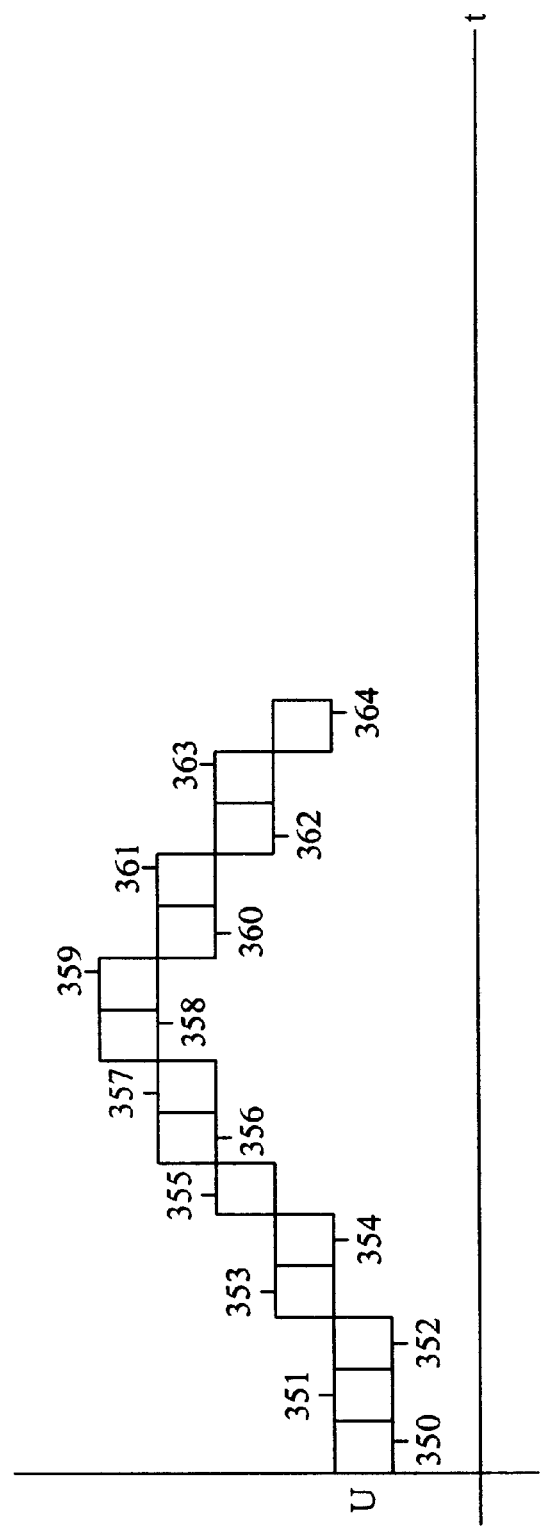
FIG. 3(c) illustrates the pixels of a digitized chrominance signal in accordance with one embodiment of the present invention.

In some embodiments of the present invention, approximate slope values are used rather than calculating the exact slope. FIG. 3(c) illustrates a method used to calculate an approximate slope for digitized chrominance signal U having pixels 350, 351, 352, 353, 354, 355, 356, 357, 358, 359, 360, 361, 362, 363, and 364. For each pixel X, the approximate slope is calculated as the difference between the average of Y pixels centered around pixel X−1 and the average of Y pixels centered around pixel X+1. For example the approximate slope for pixel 358 with Y equal to 5, is equal to {[(C355+C356+C357+C358+C359)/5]−[C357+C358+C359+C360+C361]/5}, where CX is the chrominance of pixel X. The approximate slope for this embodiment can be simplified to to (C355+C356+C360+C361)/5.

Threshold detection unit 220 determines which portions of color change signal C_U is above threshold TH or below negative threshold −TH. In one embodiment of the present invention, threshold detection unit 200 generates a threshold signal T_U indicates which portions of color change signal C_U are above threshold TH or below negative threshold −TH. FIGS. 4(a)–4(c) illustrates the relationship of threshold signal T_U with color change signal C_U, and chrominance signal U for one embodiment of the present invention. Specifically, FIG. 4(a) shows chrominance signal U; FIG. 4(b) shows color change signal C_U; and FIG. 4(c) shows threshold signal T_U. For the embodiment of FIG. 4(c), threshold signal T_U has a positive value when color change signal C_U is above threshold TH or below negative threshold −TH. Thus, as illustrated in FIGS. 4(a)–4(c), threshold signal T_U has a positive pulse 432, which corresponds to the portion 332 of color change signal C_U and a positive pulse 434 which corresponds to portion 334 of color change signal C_U. As explained above, portions 332 and 334 of color change signal C_U corresponds to portions of chrominance signal U undergoing a significant color changes. Because chrominance signals U and V are interrelated, some embodiments of the present invention will process both chrominance signals U and chrominance signal V if a significant color change occurs on either chrominance signal U or chrominance signal V. In these embodiments, threshold signals T_U and T_V could be combined as a single threshold signal.

As explained above, color changes in analog video signals should be sharpened for use with digital display system. However, sharpening all color changes in an analog video stream may require too much processing. Thus, in most embodiments of the present invention, color change sharpening unit 230 (FIG. 2) only sharpens significant color changes as indicated by threshold signal T_U. Thus, the portions of chrominance signal U corresponding to positive pulses in threshold signal T_U are sharpened. Specifically, as illustrated in FIGS. 4(a), 4(b), and 4(c), the portion of chrominance signal U within sharpening window 412 and 414, which correspond to positive pulses 432 and 434, respectively, are sharpened.

If a significant color change occurs quickly, sharpening of that significant color change is generally not necessary. The quickness of a color change is proportional to the width of the sharpening window. Thus, many embodiments of the present invention do not sharpen significant color changes if the width of sharpening window of the significant color change is less than a minimum window width WIN_MIN. On the contrary, if a significant color change occurs very slowly, sharpening of the entire sharpening window produce undesired affects. Therefore, many embodiments of the present invention limit the sharpening with a maximum window width WIN_MAX. In a specific embodiment, if a sharpening window is wider than maximum window width WIN_MAX, the width sharpening window is reduced maximum window width WIN_MAX, while retaining the same midpoint.

Figure 5C:
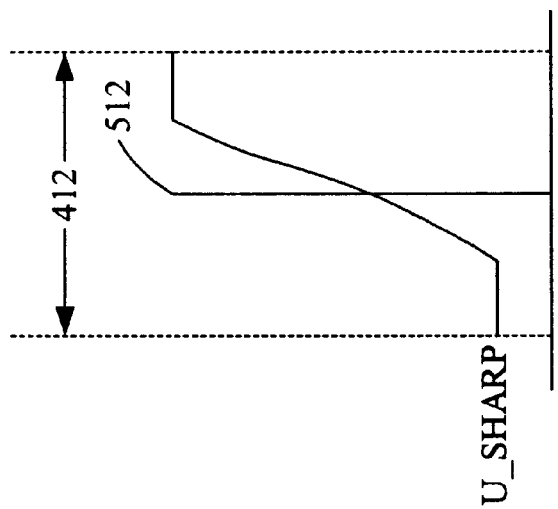
FIGS. 5(a), 5(b), and 5(c) illustrate sharpening of a chrominance signal U within an enhancement window in accordance with one embodiment of the present invention.
Figure 5B:
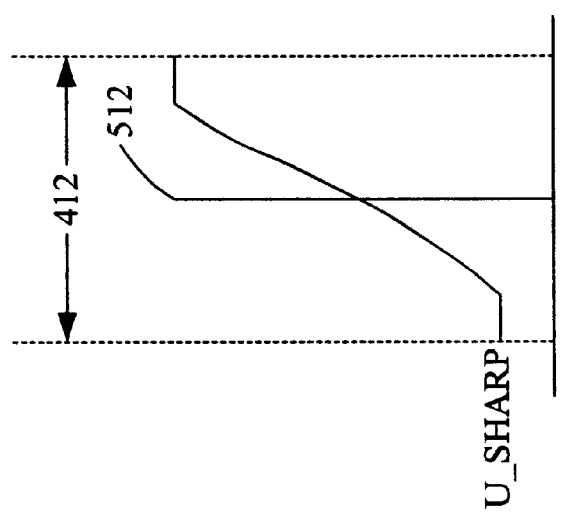
Figure 5A:
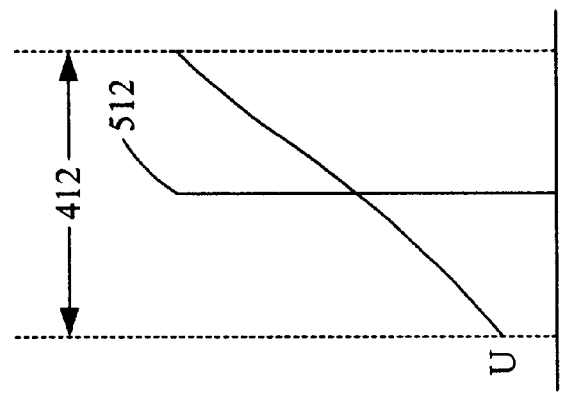

In accordance with one embodiment of the present invention, color change sharpening unit 230 sharpens a significant color change by increasing the slope of chrominance signal U by a gain factor G within a sharpening window, which corresponds to a positive pulse on threshold signal T_U. Significant color changes on chrominance signal V are processed similarly. FIGS. 5(a)–5(c) illustrates color sharpening in accordance with one embodiment of the present invention. FIG. 5(a) shows the portion of chrominance signal U, within sharpening window 412, which corresponds to positive pulse 432 of threshold signal T_U. The increased slope is relative to the center of a sharpening window. This sharpening in sharpening window 412 is with respect to center 512 of sharpening window 412. Thus, as illustrated in FIG. 5(b), sharpening chrominance signal U with a gain factor of 1.5 results in chrominance signal U_SHARP having a slope 1.5 times greater than chrominance signal U within sharpening window 412. Similarly, as illustrated in FIG. 5(c), sharpening chrominance signal U with a gain factor of 2 results in chrominance signal U_SHARP having a slope 2 times greater than chrominance signal U within sharpening window 412. To prevent abnormal color spots, some embodiments of the present invention ensures that the pixels modified by color change sharpening unit 230 are not drastically out of place. For example, in one embodiment of the present invention, the chrominance value of pixels modified by color change sharpening unit 230 must be within a range defined by the chrominance value of the two pixels adjacent to the sharpening window.

Some embodiments of the present invention makes special adjustments based on the combination of chrominance signal U and chrominance signal V. For example, in one embodiment of the present invention, if threshold signal T_U and threshold signal T_V have overlapping positive pulses, a combined sharpening window is formed for chrominance signal U and chrominance signal V. The portions of both chrominance signals U and chrominance signals V corresponding to the combined enhancement window are sharpened by color change sharpening unit 230. Some embodiments of the present invention includes a maximum size for a sharpening window. If the combined sharpening window is larger than the combined sharpening window is shortened to the maximum window size.

Although color enhancement circuits are usually limited to processing chrominance signals. Some embodiment of the present invention use the same methods and systems to enhance luminance signals. Generally, if luminance is processed by color enhancement circuit 200 (FIG. 2) separate values for gain G and threshold TH are provided for the luminance signal.

In the various embodiments of this invention, methods and structures have been described for generating a digital video signal from an analog video signal. As explained above, color changes of the analog video signal must be enhanced for a digital display system. Specifically, the chrominance portions of the analog video signal are sharpened during significant color changes. Color sharpening can be accomplished by increasing the slope of the chrominance signal during significant color changes by a gain factor G.

The various embodiments of the structures and methods of this invention that are described above are illustrative only of the principles of this invention and are not intended to limit the scope of the invention to the particular embodiments described. For example, in view of this disclosure, those skilled in the art can define other chrominance signals, color change signals, threshold signals, gain factors, thresholds, color enhancement units, color change detection units, threshold detection units, color change sharpening units, and so forth, and use these alternative features to create a method, circuit, or system according to the principles of this invention. Thus, the invention is limited only by the following claims.

What is claimed is:

1. A method of improving picture quality for an image having a chrominance signal, the method comprising:
   detecting a first significant color change from the chrominance signal; and
   sharpening the first significant color change;
   wherein the detecting a first significant color change from the chrominance signal comprises:
      detecting a first color change by calculating a change signal for the chrominance signal,
      wherein the change signal is an approximate slope for each pixel in the chrominance signal derived by calculating a first average value for a first plurality of pixels around a first pixel;
         calculating a first average value for a second plurality of pixels around a second pixel; and
         calculating a difference between the first average value and the second average value;
      setting the first color change as the first significant color change when the first color change is greater than a threshold.

2. The method of claim 1, wherein the change signal is a first derivative of the chrominance signal.

3. The method of claim 1, wherein the change signal is an approximation of the first derivative of the chrominance signal.

4. The method of claim 1, wherein:
   the first pixel and the second pixel are both adjacent to third pixel and the third pixel; and
   a value of the change signal at the third pixel is equal to the difference.

5. A method of improving picture quality for an image having a chrominance signal, the method comprising:
   detecting a first significant color change from the chrominance signal; and
   sharpening the first significant color change;
   wherein the sharpening the first significant color change, comprises:
      defining a first sharpening window containing the first significant color change; and
      increasing the slope of the chrominance signal within the first sharpening window.

6. The method of claim 5, further comprising reducing the width of the first sharpening window when the first sharpening window is wider than a maximum window width.

7. The method of claim 5, wherein defining a first sharpening window containing the first significant color change comprises:
   generating a color change signal from the chrominance signal;
   generating a threshold signal by comparing the color change signal to a threshold; and
   defining the first sharpening window where the color change signal is greater than the threshold.

8. The method of claim 5, wherein increasing the slope of the chrominance signal within the first sharpening window comprises increasing the slope of the chrominance signal by a gain factor with respect to the center of the first sharpening window.

9. The method of claim 1, further comprising:
   detecting a second significant color change from the chrominance signal; and
   sharpening the second significant color change.

10. The method of claim 1, further comprising:
    detecting a second significant color change from a second chrominance signal; and
    sharpening the second significant color change.

11. The method of claim 1, further comprising:
    detecting a significant luminance change from a luminance signal; and
    sharpening the significant luminance change.

12. The method of claim 5, further comprising:
    detecting a second significant color change from a second chrominance signal; and
    sharpening the second significant color change.

13. The method of claim 5, further comprising:
    detecting a significant luminance change from a luminance signal; and
    sharpening the significant luminance change.

14. A color enhancement system configured to enhance a chrominance signal of an image, the color enhancement system comprising:
    a color change detection unit configured to receive the chrominance signal and configured to detect one or more color changes from the chrominance signal and to generate a color change signal from the chrominance signal;
    a color change sharpening unit coupled to the color change detection unit and configured to generate a sharpened chrominance signal; and
    a threshold detection unit coupled to the color change detection unit and the color change sharpening unit and configured to compare the color change signal to a threshold and generate a threshold signal having a plurality of pulses, wherein each of the pulses define a sharpening window to form a plurality of sharpening windows.

15. The color enhancement circuit of claim 14 wherein the color change signal is a first derivative of the chrominance signal.

16. The color enhancement circuit of claim 14, wherein the color change signal is an approximation of a first derivative of the chrominance signal.

17. The color enhancement circuit of claim 14 wherein the color change sharpening unit is configured to sharpen the chrominance signal within each of the sharpening windows.

18. The color enhancement circuit of claim 14 wherein the color change sharpening unit is configured to increase a slope of the chrominance signal within each of the sharpening windows.

19. A color enhancement system configured to enhance a chrominance signal of an image, the color enhancement system comprising:
    a color change detection unit configured to receive the chrominance signal and configured to detect one or more color changes from the chrominance signal;

a threshold detection unit coupled to the color change detection unit configured to compare the color changes to a threshold and to set a color change as a significant color change when a color change is greater than the threshold and configured to generate a threshold signal comprising a plurality of pulses, wherein each pulse surrounds one of the significant color changes and each the pulses defines a sharpening window to form a plurality of sharpening windows; and a color change sharpening unit coupled to the color change detection unit and configured to generate a sharpened chrominance signal.

20. The color enhancement circuit of claim 19, wherein the color change detection unit is configured to generate a color change signal from the chrominance signal.

21. The color enhancement circuit of claim 20 wherein the color change signal is a first derivative of the chrominance signal.

22. The color enhancement circuit of claim 20, wherein the color change signal is an approximation of a first derivative of the chrominance signal.

23. The color enhancement circuit of claim 19, wherein the color change sharpening unit is configured to sharpen the chrominance signal within each of the sharpening windows.

24. The color enhancement circuit of claim 19, wherein the color change sharpening unit is configured to increase a slope of the chrominance signal within each of the sharpening windows.

25. The method of claim 19 further comprising:

detecting a second significant color change from the chrominance signal; and sharpening the second significant color change.

* * * * *